J. SCHADE.
FLEXIBLE CHAIN.
APPLICATION FILED JULY 17, 1917.
1,266,996. Patented May 21, 1918.
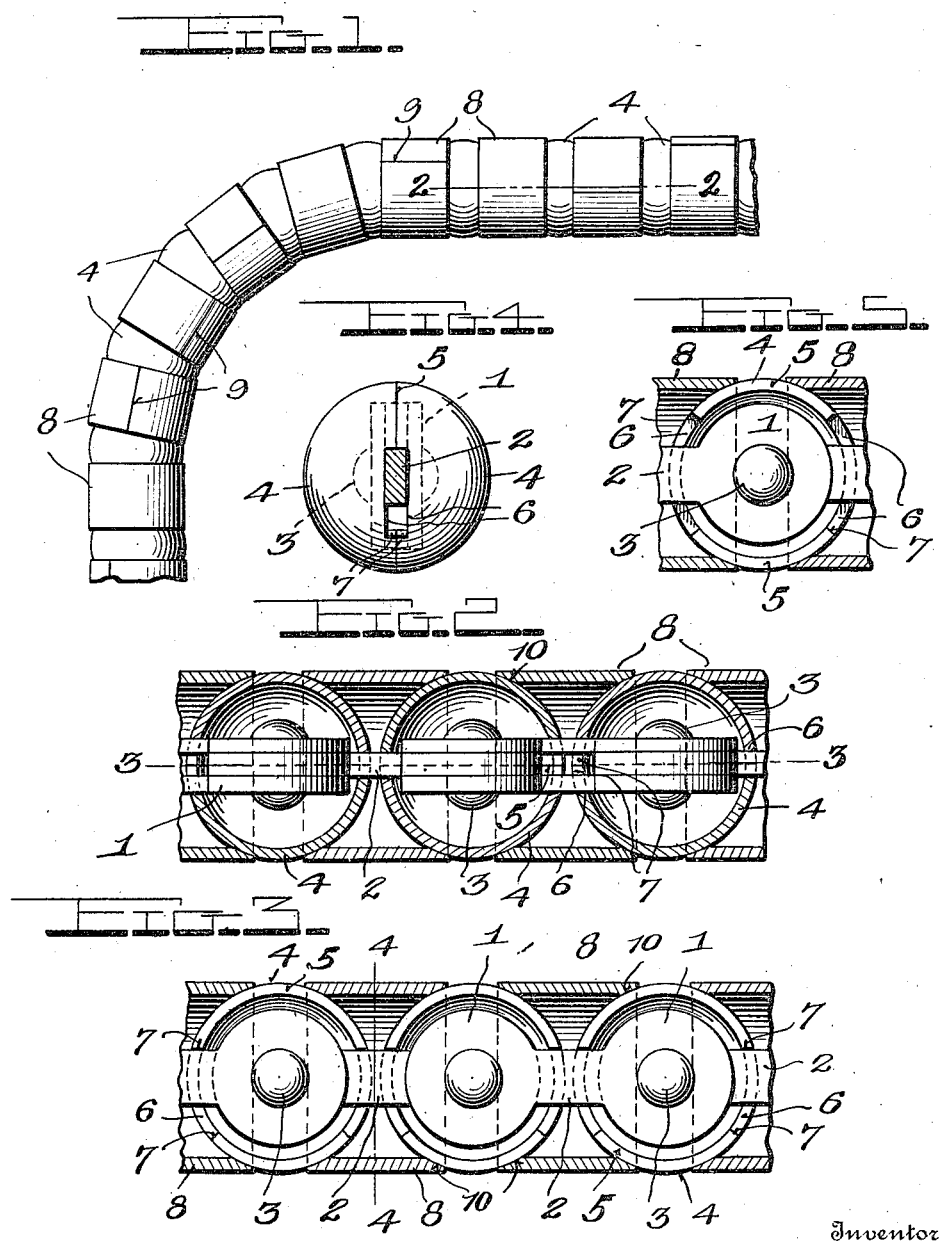
Inventor
John Schade
By 
Attorney

UNITED STATES PATENT OFFICE.

JOHN SCHADE, OF HOLYOKE, MASSACHUSETTS, ASSIGNOR TO NATIONAL BLANK BOOK COMPANY, OF HOLYOKE, MASSACHUSETTS, A VOLUNTARY TRUST ASSOCIATION OF COPARTNERSHIP HAVING AS TRUSTEES J. W. TOWNE, F. B. TOWNE, E. S. TOWNE, J. M. TOWNE, AND F. W. WILSON.

FLEXIBLE CHAIN.

1,266,996.  Specification of Letters Patent.  Patented May 21, 1918.

Application filed July 17, 1917. Serial No. 181,062.

*To all whom it may concern:*

Be it known that I, JOHN SCHADE, a citizen of the United States, residing at Holyoke, Hampden county, State of Massachusetts, have invented certain new and useful Improvements in Flexible Chains; and I do declare the following to be a full, clear, and exact description of the invention, such as will enable others skilled in the art to which it appertains to make and use the same.

This invention relates to certain new and useful improvements in a flexible chain, its main object being to provide a chain having a housing which may flex with the chain and still maintain tight joints throughout during such flexure.

The invention consists broadly in housing or inclosing the pivotally connected eyes of a cable chain with spherical balls or shells and encircling the bar part of each link with a tubular sleeve which embraces portions of adjacent ball members and constitutes sockets therefor.

The invention further resides in the specific features of construction and arangements of parts described in detail in the following specification and briefly set forth in the appended claims, reference being had to the accompanying drawing wherein, Figure 1 is an elevation of a chain constructed in accordance with the present invention;

Fig. 2 is a longitudinal section thereof on line 2—2 of Fig. 1;

Fig. 3 is a similar view taken at right angles to Fig. 2;

Fig. 4 is a transverse section on line 4—4 of Fig. 3; and

Fig. 5 is a sectional view of a slightly modified form of the invention.

Referring more in detail to the drawing, the numeral 1 designates the terminal eyes of a link in a chain of the cable type, and 2 the connecting link bar, said links having their eyes pivotally connected to each other by rivets 3 for flexing in an obvious manner.

The pivotal joints of the cable link are housed by an inclosing shell or ball 4 which is preferably composed of a pair of hemispherical parts, the eyes 1 being concentrically arranged within the shell, as depicted in Fig. 3. The opposing or abutting edges 5 are cut out to form slots 6 on opposite sides of the sphere for receiving the link bars 2, the degree of flexure of the chain being defined by the end walls 7 of the slots 6.

The link bars 2 are housed or inclosed by tubular sleeves 8 which are preferably constructed by rolling a strip of material into circular form with the edges 9 left unsecured or free. The opposite ends of the sleeves or socket members are formed with conical seats 10 for receiving the adjacent ball members to hold their component parts together. Consequently, a ball and socket joint is provided for a flexible chain housing which may flex to any predetermined degree without the presentation of any open joints.

The degree of flexure permitted the chain, as before stated, is limited or defined by the end walls 7. In certain instances, it is desirable to have the chain links flex in one direction only, and to this end one end wall of each slot 6, which must be on the same side of the longitudinal axis of the chain, is extended parallel with and located nearer the normal longitudinal axis of said inner chain, as depicted in Fig. 3, to engage the respective link bars when the chain is normally straight. Consequently, the flexible housing for the chain limits the flexure thereof in one direction only, the chain being retained in a straight or bar-like form when swung in the opposite direction.

To afford flexure of the chain in either direction, the end walls of the slot 6 are disposed equi-distant from the longitudinal axis of the chain as illustrated in Fig. 5.

In the preferred construction the tubular socket members embrace the spherical shells under a resilient tension so that should the inner chain stretch, said tubular parts will still preserve a resilient grasp upon the hemispherical parts so that there will be a good tight joint all the time. This affords a dirt-tight joint and housing for the inner chain without detracting from the flexibility thereof.

What is claimed is:

1. A chain comprising a plurality of flat links pivotally connected and each link comprising a central bar part and terminal eyes, complemental hemi-spherical shells inclosing the pivotally connected eyes of adjacent links and cut-away at their meeting edges to form slots for receiving and permitting limited movement of the link bars, and a tubular socket member surrounding the bar part of each link and receiving and engaging the adjacent shells in its opposite ends.

2. A chain comprising a plurality of flat links pivotally connected and each link comprising a central bar part and terminal eyes, complemental hemi-spherical shells inclosing the pivotally connected eyes of adjacent links and cut-away at their meeting edges to form slots for receiving and permitting limited movement of the link bars, and a socket member inclosing each link bar and comprising a strip of resilient metal rolled into tubular form with its edges free to expand and contract, said socket members receiving a complete shell in each end and engaging the same under tension.

3. A chain comprising a plurality of pivotally connected links, a ball housing for each pivotal joint, and a sleeve interposed between adjacent ball housings for inclosing the bar part of the link.

4. A chain comprising a plurality of pivotally connected links, a ball housing for each pivotal joint having opposing slots in which the bar parts of the links operate and which define the flexure of said joint, and socket members arranged between adjacent ball housings and receiving the latter.

5. A chain comprising a plurality of pivotally connected links, a ball housing for each pivotal joint composed of hemi-spherical parts each formed with spaced cut-outs in its edge to provide with the cut-outs in the companion part spaced slots for receiving the bar parts of the links, and housings for the bar parts interposed between adjacent ball housings.

6. In a chain, a plurality of flexibly connected links, independent means surrounding each joint for defining the degree of flexure, and a sustaining spacer between each means.

In testimony whereof I affix my signature.

JOHN SCHADE.

Witnesses:
I. M. TOWNE,
F. W. WEISSBROD.

Copies of this patent may be obtained for five cents each, by addressing the "Commissioner of Patents, Washington, D. C."